(12) United States Patent
Crivello

(10) Patent No.: US 6,268,403 B1
(45) Date of Patent: Jul. 31, 2001

(54) PHOTOPOLYMERIZIBLE COMPOSITIONS CONTAINING CYCLOALIPHATIC EPOXYALCOHOL MONOMERS

(75) Inventor: James V. Crivello, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 09/637,954

(22) Filed: Aug. 11, 2000

Related U.S. Application Data

(63) Continuation of application No. PCT/US99/02892, filed on Feb. 11, 1999.
(60) Provisional application No. 60/075,116, filed on Feb. 11, 1998.

(51) Int. Cl.$^7$ .......................... C08G 59/20; C08G 59/40; C08G 59/62; C08G 59/68; C08L 63/00; C08L 63/02; C08L 63/04
(52) U.S. Cl. .......................... 522/31; 522/146; 522/170; 528/87; 528/418; 528/419; 528/421
(58) Field of Search .................................. 522/31, 32, 66, 522/146, 170; 528/403, 410, 412, 418, 419, 421, 87; 549/463, 518, 522, 546

(56) References Cited

U.S. PATENT DOCUMENTS

| 3,280,152 | * | 10/1966 | Tinsley et al. . |
| 3,867,323 | * | 2/1975 | Rifi . |
| 4,123,445 | * | 10/1978 | Lyons . |
| 4,175,972 | * | 11/1979 | Crivello . |
| 4,318,766 | * | 3/1982 | Smith . |
| 4,487,945 | * | 12/1984 | Payne . |
| 4,554,365 | * | 11/1985 | Mulder . |
| 4,707,232 | * | 11/1987 | Batzill et al. . |
| 4,814,361 | * | 3/1989 | Koleske et al. . |
| 5,198,532 | * | 3/1993 | Blytas et al. . |

FOREIGN PATENT DOCUMENTS

3233251 A1 * 9/1982 (DE) .

* cited by examiner

*Primary Examiner*—Susan W. Berman
(74) *Attorney, Agent, or Firm*—Heslin & Rothenberg, P.C.

(57) ABSTRACT

A method of accelerating the cure rate of an epoxy curing composition includes combining a cycloaliphatic epoxyalcohol monomer, a non-hydroxyl-containing epoxy monomer and a cationic photoinitiator to form an epoxy curing composition, and exposing the curing composition to a source of radiation. The resulting polymers and copolymers are branched polyethers containing hydroxyl functionality.

16 Claims, 5 Drawing Sheets

PHOTOPOLYMERIZIBLE COMPOSITIONS CONTAINING CYCLOALIPHATIC EPOXYALCOHOL MONOMERS

CROSS REFERENCE TO RELATED APPLICATION

This application is a continuation of application PCT/US 99/02892 filed Feb. 11, 1999, which claims priority of U.S. Provisional Application, Serial No. 60/075,116, filed Feb. 11, 1998, the disclosure of which is incorporated herein by reference.

TECHNICAL FIELD

The present invention relates to photopolymerizible compositions containing epoxyalcohol monomers.

BACKGROUND OF THE INVENTION

UV- and radiation-curable systems have become commercially important in traditional applications such as coatings, inks, adhesives and composites due to public concern about the effect of organic vapor emissions on the environment. Such systems typically produce very low emissions, because solvents are not required in formulations and because polymerizations proceed to high conversions. Epoxy monomers are the materials of choice in many UV- and radiation-curable applications because of their excellent chemical resistance and excellent mechanical properties. Cycloaliphatic epoxy monomers undergo the most rapid curing of any type of epoxy monomer. However, the cure speed of even these monomers is insufficient for many high speed production processes. There is, therefore, a need to develop new epoxy monomers which can cure at higher rates.

SUMMARY OF THE INVENTION

It has been found surprisingly that cycloaliphatic epoxyalcohol monomers that bear both hydroxy and epoxy groups have UV and radiation cure rates which exceed those of analogous non-hydroxy-containing epoxy monomers. In addition, when these are combined with conventional multifunctional epoxy monomers, a marked increase in the polymerization rate of the conventional monomers can be obtained.

In one aspect, the invention relates to a photopolymerizible composition comprising:

(a) a cationic photoinitiator; and
(b) at least one cycloaliphatic epoxyalcohol monomer of formula 1

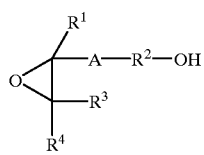

wherein:

A is a direct bond or $C_1$–$C_4$ alkyl
$R^1$ is hydrogen, or $C_1$–$C_{12}$ alkyl;
$R^2$ is a direct bond or $C_1$–$C_4$ alkyl;
$R^3$ is $C_1$–$C_{12}$ hydrocarbon;
$R^4$ is hydrogen, or $C_1$–$C_4$ alkyl; or
$R^1$ and $R^3$, taken together, or A and $R^3$, taken together, form a cyclic 5- or 6- membered aliphatic ring, a cyclic 5- or 6- membered aliphatic ring substituted with 1–3 $C_1$–$C_4$ alkyl groups, a bicyclic 9- or 10-membered aliphatic ring, or a bicyclic 9- or 10-membered aliphatic ring substituted with 1–3 $C_1$–$C_4$ alkyl groups. Preferably, the cycloaliphatic epoxyalcohol monomer is chosen from:

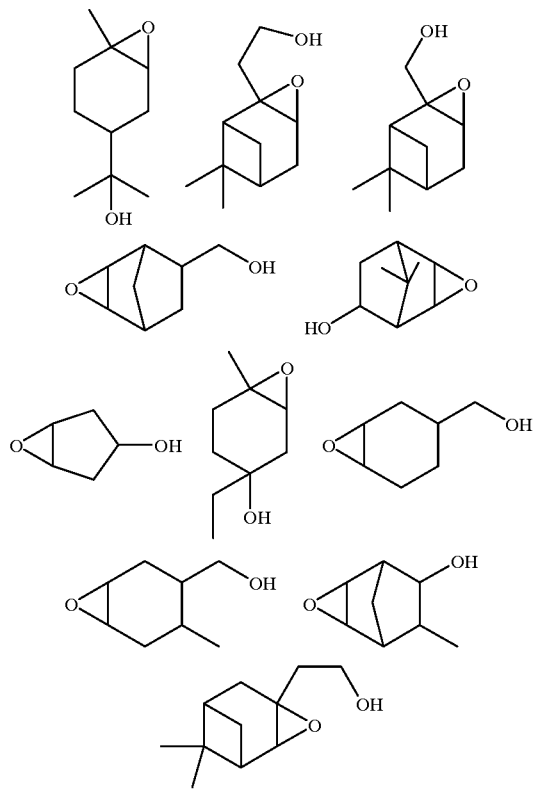

More preferably, the cycloaliphatic epoxyalcohol monomer is chosen from:

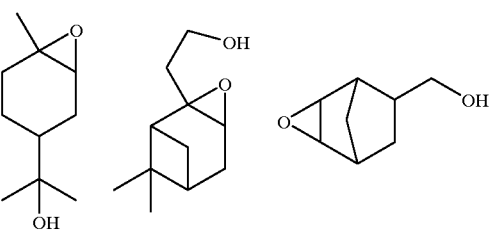

In another embodiment, curing compositions further comprise a non-hydroxyl-containing epoxy monomer. Preferred non-hydroxyl-containing epoxy monomers are 3,4-epoxycyclohexyl-3',4'-epoxycyclohexane carboxylate, bis-(3,4-epoxycyclohexyl)adipate, 4-vinylcyclohexene dioxide, limonene dioxide, dicyclopentadiene dioxide, 1,2-epoxytetradecane, 1,2-epoxydecane, 1,2-epoxydodecane, bisphenol-A diglycidyl ether, bisphenol-F diglycidyl ether, 1,4-butanediol diglycidyl ether, diglycidyl ethers of tetrabromo-bisphenol-A, epoxy cresol novolacs, epoxy phenol novolacs, epoxidized soybean oil, epoxidized linseed oil and diglycidyl phthalate. More preferred non-hydroxyl-containing epoxy monomers are 3,4-epoxycyclohexyl-3',4'-epoxycyclohexane carboxylate, bis-(3,4-epoxycyclohexyl) adipate, 4-vinylcyclohexene dioxide, limonene dioxide, and dicyclopentadiene dioxide.

In another aspect, the invention relates to a method of accelerating the cure rate of an epoxy curing composition comprising:

(a) combining to form an epoxy curing composition:
(1) an amount of at least one cycloaliphatic epoxyalcohol monomer of formula 1 sufficient to cause at least 50% increase in cure speed of the epoxy curing composition,
(2) at least one non-hydroxyl-containing epoxy monomer chosen from the group consisting of: 3,4-epoxycyclohexyl-3',4'-epoxycyclohexane carboxylate, bis-(3,4-epoxycyclohexyl)adipate, 4-vinylcyclohexene dioxide, limonene dioxide, dicyclopentadiene dioxide, 1,2-epoxytetradecane, 1,2-epoxydecane, 1,2-epoxydodecane, bisphenol-A diglycidyl ether, bisphenol-F diglycidyl ether, 1,4-butanediol diglycidyl ether, diglycidyl ethers of tetrabromo-bisphenol-A, epoxy cresol novolacs, epoxy phenol novolacs, epoxidized soybean oil, epoxidized linseed oil and diglycidyl phthalate; and
(3) a cationic photoinitiator; and (b) exposing the epoxy curing composition to a source of radiation.

Preferred cycloaliphatic epoxyalcohol monomers and non-hydroxyl-containing epoxy monomers are those listed above under curing compositions.

In yet another aspect, the present invention relates to a polymer comprising repeating units of formula 2:

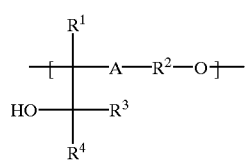

2 wherein the definitions of the variable residues are as before. It is preferred that the repeating units be derived from the cycloaliphatic epoxyalcohol monomer and non-hydroxyl-containing epoxy monomers listed above under curing compositions.

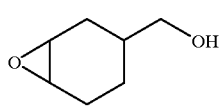

I

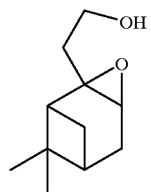

II

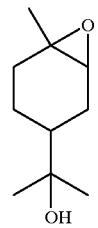

III

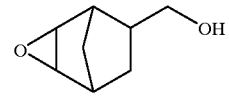

IV

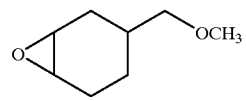

IM

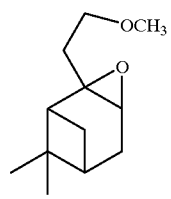

IIM

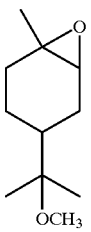

IIIM

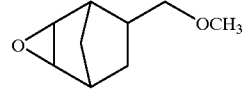

IVM

Figure 2:
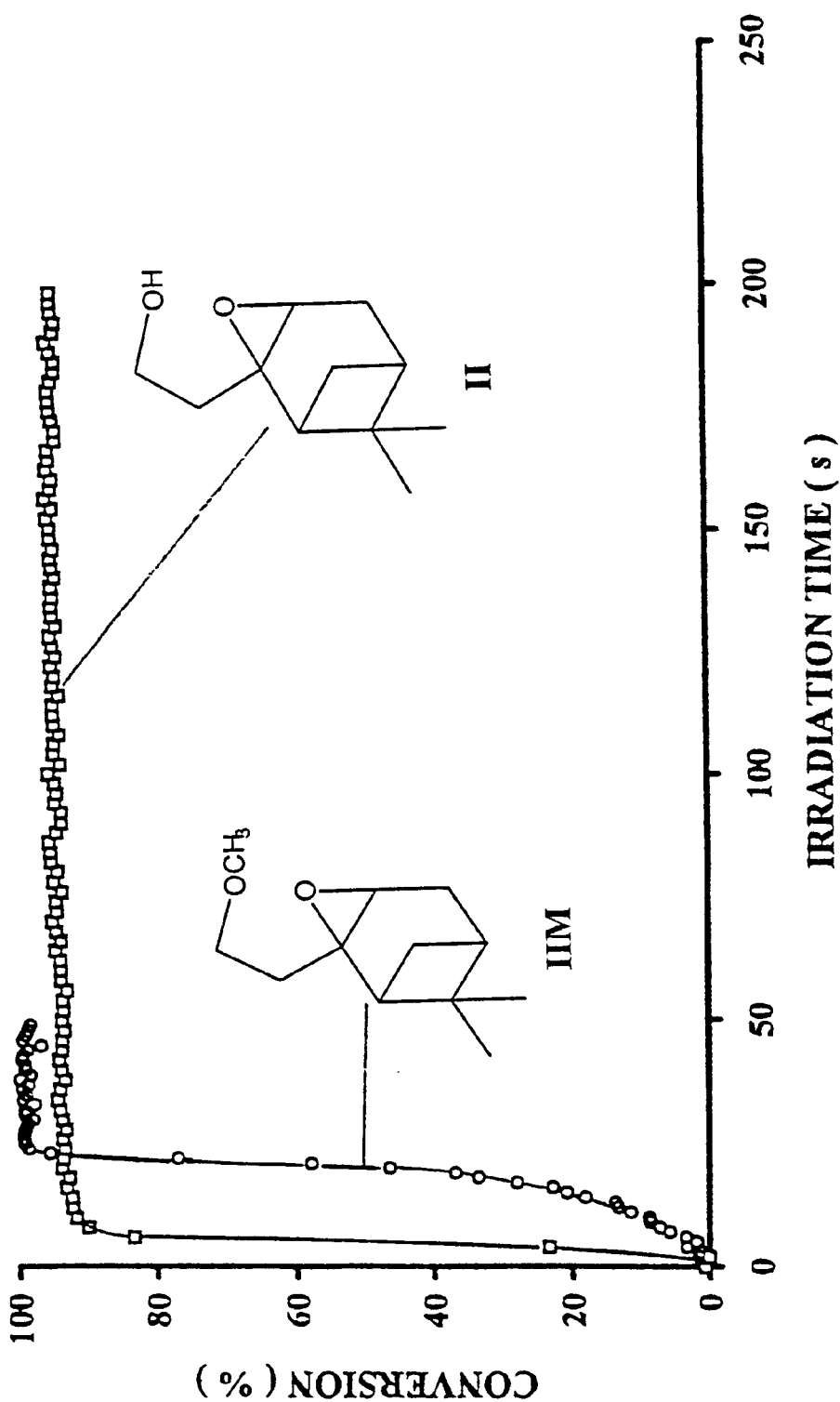

FIG. 2 is a graph of % conversion as a function of irradiation time showing a comparison of the cationic photopolymerization of a curing composition containing the cycloaliphatic epoxyalcohol Nopol epoxide II and 0.5% IOC10 as photoinitiator with one containing the corresponding methyl ether IIM and the same initiator.

Figure 3:
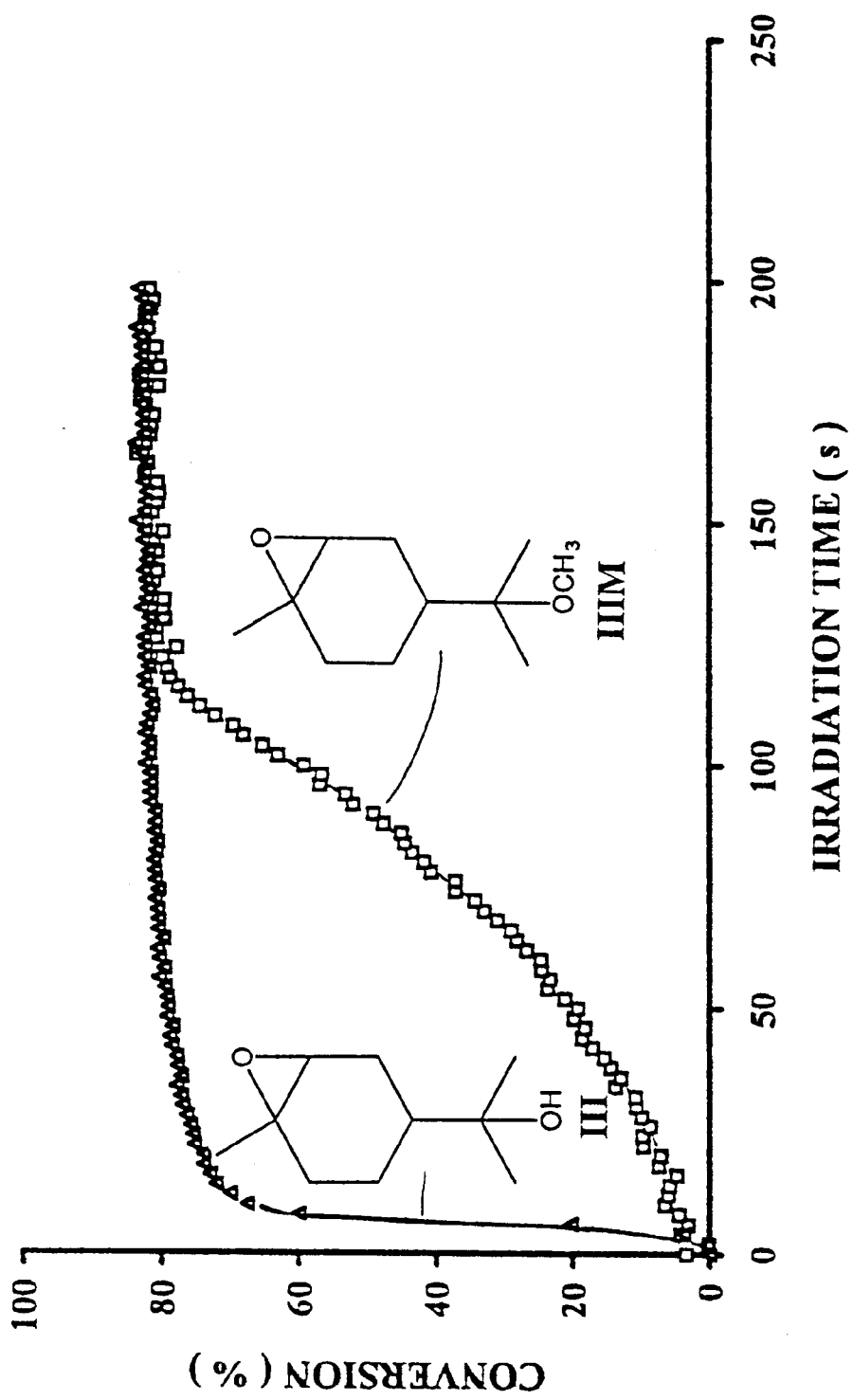

FIG. 3 is a graph of % conversion as a function of irradiation time showing a comparison of the cationic photopolymerization of a curing composition containing the cycloaliphatic epoxyalcohol epoxidized α-terpineol III and 0.5% IOC10 as photoinitiator with one containing the corresponding methyl ether IIIM and the same initiator.

Figure 4:
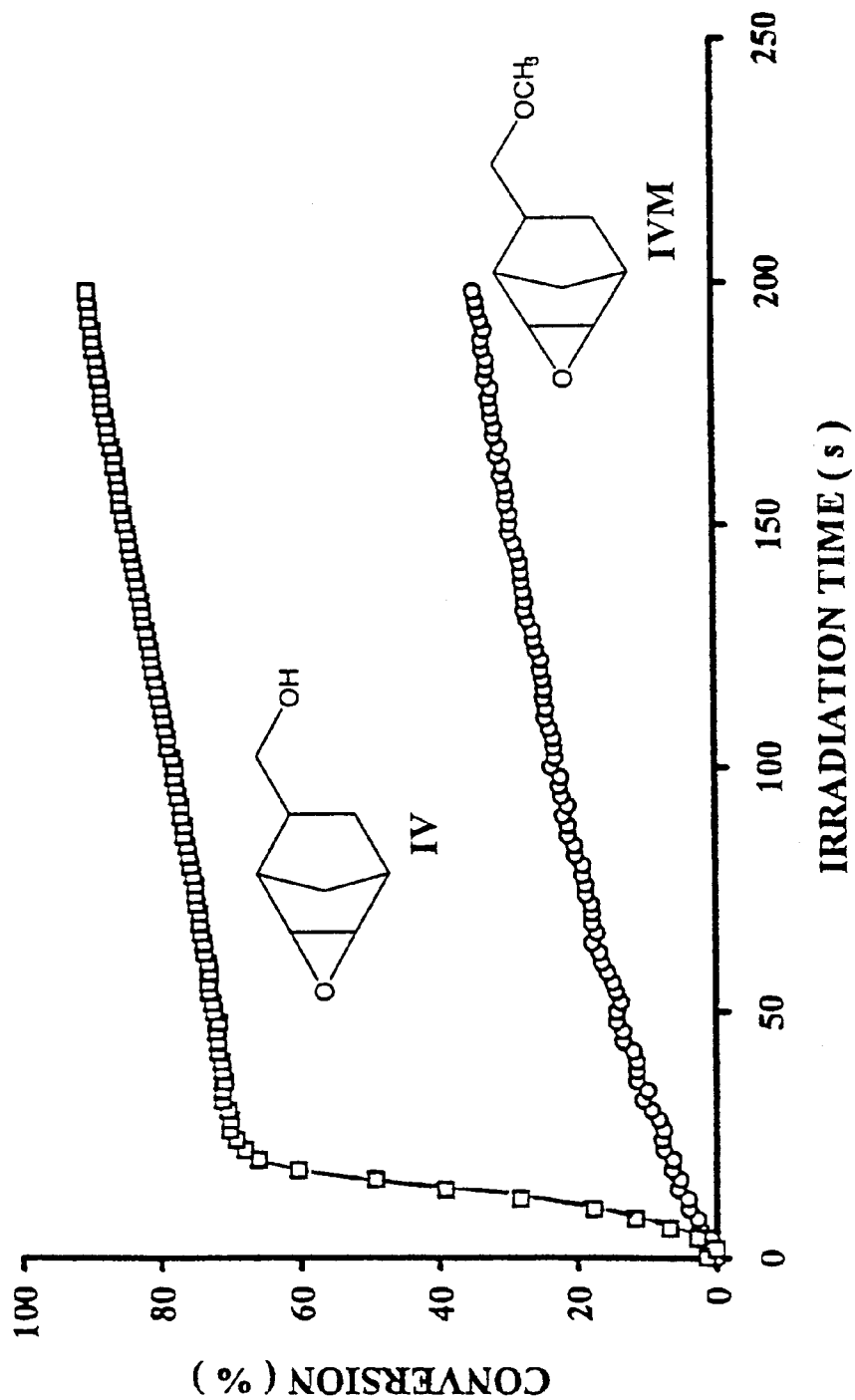

FIG. 4 is a graph of % conversion as a function of irradiation time showing a comparison of the cationic photopolymerization of a curing composition containing the cycloaliphatic epoxyalcohol epoxidized norbornene IV and 0.5% IOC10 as photoinitiator with one containing the corresponding methyl ether IVM and the same initiator.

Figure 5:
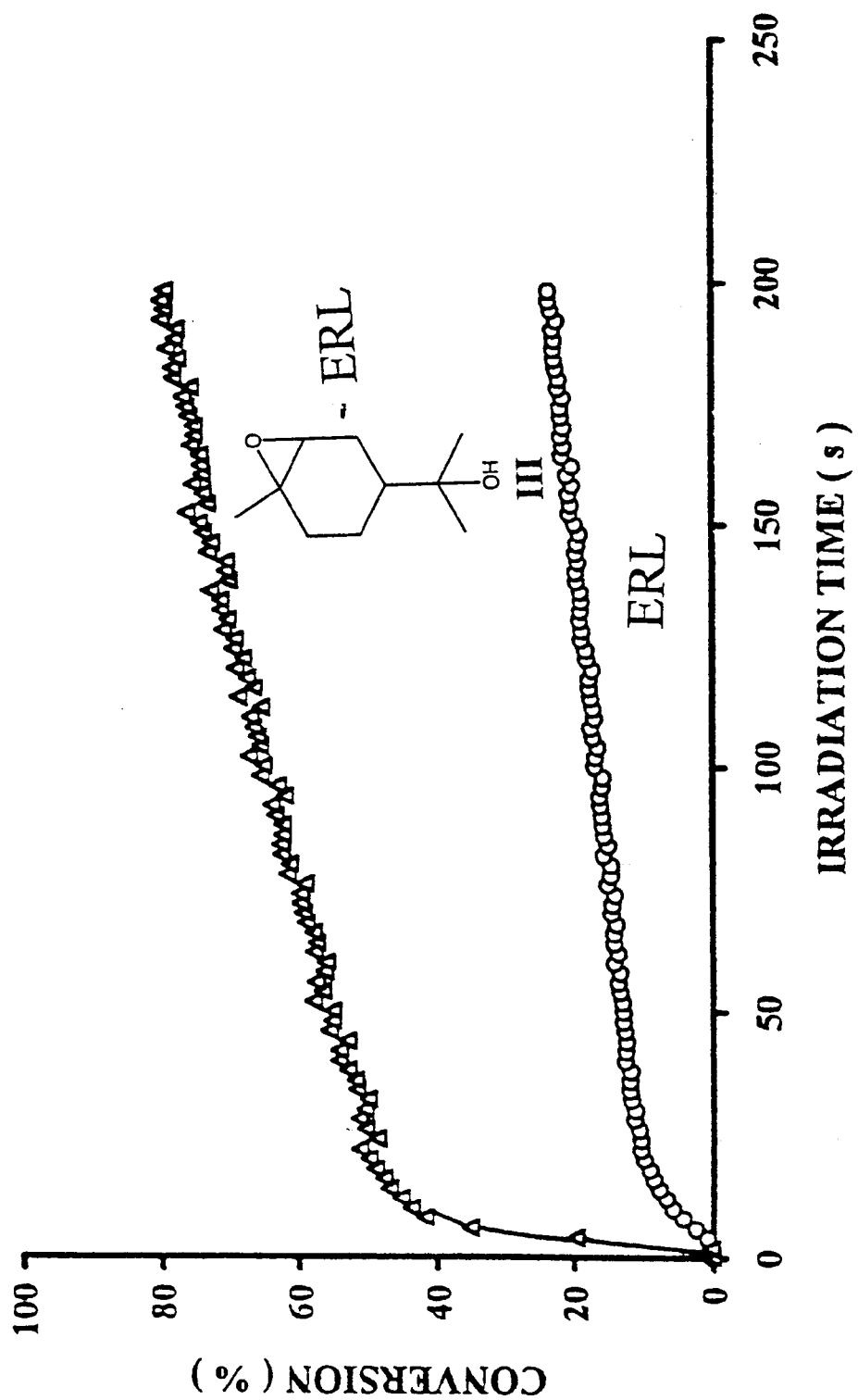

FIG. 5 is a graph of % conversion as a function of irradiation time showing a comparison of the cationic photopolymerization of a curing composition containing 3,4-epoxycyclohexylmethyl-3',4'-epoxycyclohexane carboxylate (ERL) and 0.5% IOC10 as photoinitiator with one containing ERL, one molar equivalent of cycloaliphatic epoxyalcohol III and the same initiator.

DETAILED DESCRIPTION OF THE INVENTION

It has been discovered that cycloaliphatic epoxyalcohols, when combined with cationic initiators and exposed to a source of radiation, polymerize very rapidly. Surprisingly, these monomers are more reactive in radiation-induced cationic polymerization than comparable monomers in which the hydroxy group is omitted. For example, 3,4-epoxycyclohexanol polymerizes more rapidly than epoxycyclohexane when irradiated with UV light in the presence of diaryliodonium salt photoinitiators. In addition, it has also been discovered that when cycloaliphatic epoxyalcohols are included in an epoxy curing composition composed of at least one non-hydroxyl-containing epoxy monomer and a cationic photoinitiator, the polymerization or cure rate of the non-hydroxyl-containing epoxy monomer can be accelerated significantly. Therefore, the present invention encompasses a method of accelerating the cure rate of an epoxy curing composition, photocurable compositions incorporating cycloaliphatic epoxyalcohol monomers, and polymers and copolymers of cycloaliphatic epoxyalcohol monomers.

The method of the present invention for accelerating the cure rate of an epoxy curing composition comprises:

(a) combining at least one cycloaliphatic epoxyalcohol monomer, at least one non-hydroxyl-containing epoxy monomer and a cationic photoinitiator; and (b) exposing said epoxy curing composition to a source of radiation. Useful types of radiation include infrared, UV and visible light, and x-ray and e-beam radiation. In a preferred method, an amount of a cycloaliphatic epoxyalcohol sufficient to cause at least a 10% increase in the cure rate of an non-hydroxyl-containing epoxy monomers is utilized.

Photopolymerizible curing compositions of the present invention comprise a cationic photoinitiator and at least one cycloaliphatic epoxyalcohol monomer. In a preferred embodiment, at least one non-hydroxyl-containing epoxy monomer is included in the composition.

The curing compositions may be cured using radiation, including UV or visible light, e-beam or x-ray irradiation, and with heat. Exemplary initiators or curing agents which may be used to initiate photopolymerization are diaryliodonium salts, triarylsulfonium salts, diaryliodosonium salts, dialkyl phenylsulfonium salts, dialkyl (hydroxydialkylphenyl)-sulfonium salts and ferrocenium salts. Such onium salts may be modified by the attachment of alkyl, alkoxy, siloxy and the like groups without decreasing their utility. A preferred initiator is (4-n-decyloxyphenyl) phenyliodonium hexafluoroantimonate. Another such photoinitiator is 4-(2-hydroxytetradecyloxyphenyl) phenyliodonium hexafluoroantimonate, sold by Sartomer Chemical as Sarcat CD-1012. Still another preferred photoinitiator is triarylsulfonium salt, Sarcat CD-1010, also available from Sartomer Chemical Co. Typically, the photoinitiator is employed in concentrations ranging from 0.1 to 10% by weight based on the monomer or monomers. The photoinitiator should be soluble in the monomer or mixture of monomers, but exhibit minimal solubility in the suspending medium.

Cycloaliphatic epoxyalcohols for use in the methods and curing compositions of the present invention have the general structure:

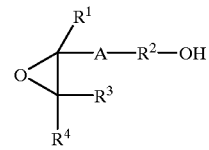

wherein:

A is a direct bond or $C_{-1}C_4$ alkyl $R^1$ is hydrogen, or $C_1$–$C_{12}$ alkyl;

$R^2$ is a direct bond or $C_1$–$C_4$ alkyl;

$R^3$ is $C_1$–$C_{12}$ hydrocarbon;

$R^4$ is hydrogen, or $C_1$–$C_4$ alkyl; or $R^1$ and $R^3$, taken together, or A and $R^3$, taken together, form a cyclic 5- or 6- membered aliphatic ring, a cyclic 5- or 6- membered aliphatic ring substituted with 1–3 $C_1$–$C_4$ alkyl groups, a bicyclic 9- or 10-membered aliphatic ring, or a bicyclic 9- or 10-membered aliphatic ring substituted with 1–3 $C_1$–$C_4$ alkyl groups.

The term "hydrocarbon" is intended to include linear, branched, or cyclic structures containing only hydrogen and carbon, and combinations thereof, regardless of oxidation state. Alkyl is a subset of hydrocarbon and is intended to include fully saturated linear, or branched structures and combinations thereof Examples of alkyl groups containing from 1 to 4 carbon atoms are methyl, ethyl, propyl, isopropyl, butyl, and s-and t-butyl. Cyclic structures included within the definition of hydrocarbon are alkanes, arenes, cyclic 5- or 6- membered aliphatic rings, cyclic 5- or 6- membered aliphatic rings substituted with 1–3 $C_1$–$C_4$ alkyl groups, bicyclic 9- or 10-membered aliphatic rings, and bicyclic 9- or 10-membered aliphatic rings substituted with 1–3 $C_1$–$C_4$ alkyl groups. Examples of cyclic 5- or 6-membered aliphatic rings are cyclopentyl, and cyclohexyl. Examples of bicyclic 9-or 10-membered rings are norbornyl and indanyl.

Cycloaliphatic epoxyalcohol monomers are monomers in which the epoxy (oxirane) ring is fused to a 5- or 6-membered cycloalkane. The cycloalkane may be further substituted, as in the formation of bicycloalkanes. Preferred cycloaliphatic epoxyalcohols are shown below.

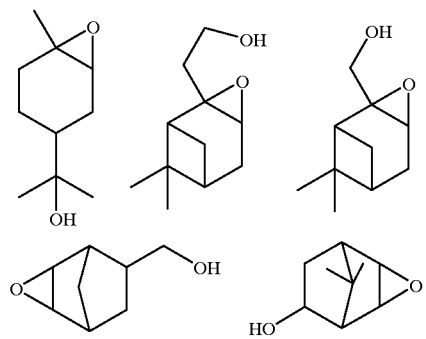

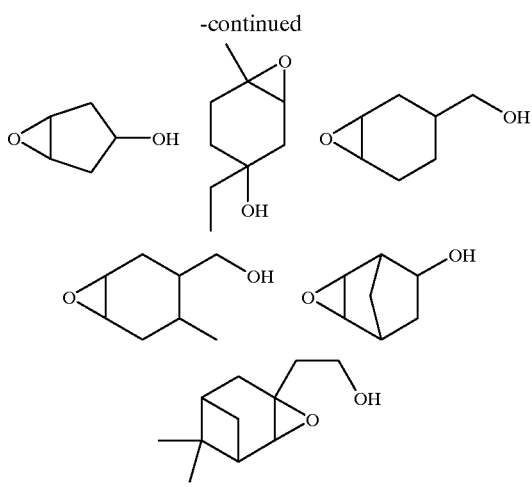

Particularly preferred cycloaliphatic epoxyalcohols are:

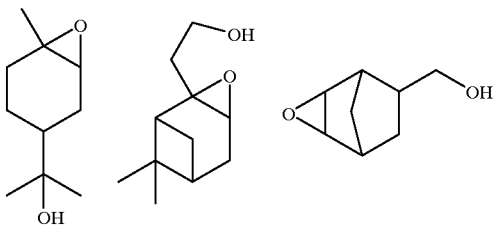

Cycloaliphatic epoxyalcohols may be prepared by epoxidation of hydroxy alkenes using known epoxidizing reagents, including, but not limited to, peracetic acid, m-chloroberbenzoic acid, performic acid, Oxone®, and t-butylhydroperoxide-transition metal combinations. For example, readily available compounds such as terpene alcohols and cyclohexene-containing products of Diels-Alder reactions may be epoxidized to yield cycloaliphatic epoxyalcohol monomers. An effective technique is the use of a commercially available potassium peroxysulfate reagent, OXONE®, to oxidize terpene alcohols to cycloaliphatic epoxyalcohols.

For the methods and the curing compositions of the present invention, at least one non-hydroxyl-containing epoxy monomer including commercially available epoxies, may be combined with at least one cycloaliphatic epoxyalcohol. These non-hydroxyl-containing epoxy monomers include, but are not limited to, expoxidized alkenes such as 1,2-epoxyoctane, 1,2-epoxydecane, 1,2,13,14-tetradecane diepoxide, 1,2,7,8-octane diepoxide; epichlorohydrin; alicyclic epoxides such as limonene dioxide, α-pinene oxide, dicyclopentadiene dioxide, 4-vinylcyclohexene dioxide, 3,4-epoxycyclohexylmethyl-3',4'-epoxycyclohexene carboxylate, cyclohexene oxide, cyclopentene oxide, cycloheptene oxide, cyclooctene oxide, 1,2,5,6-cyclooctadiene dioxide; glycidyl ethers such as butanediol diglycidyl ether, bisphenol-A-diglycidyl ether, bisphenol-A-extended glycidyl ethers, phenol-formaldehyde glycidyl ethers (epoxy novolacs), and cresol-formaldehyde glycidyl ethers (epoxy cresol novolacs); epoxy ethers such as diglycidyl phthalate; epoxidized vegetable oils such as epoxidized linseed, soybean, safflower, sunflower, rapeseed, canola oil; silicone epoxy resins; epoxidized polymers such as epoxidized polybutadiene, epoxidized polyisoprene and epoxidized polystyrene-co-butadiene. Preferred epoxy-functional monomers are 3,4-epoxycyclohexyl-3',4'-epoxycyclohexane carboxylate, bis-(3,4-epoxycyclohexyl) adipate, 4-vinylcyclohexene dioxide, limonene dioxide, and dicyclopentadiene dioxide. Limonene dioxide is available from the SEM Corporation, and 3,4-epoxy cyclohexylmethyl-3,4-epoxycyclohexane carboxylate is available from Union Carbide as ERL 4221E, and from Ciba Geigy Corporation as CY 179. High molecular weight, multifunctional epoxy resins known in the art may also be utilized. Where such high molecular weight comonomers are used, cycloaliphatic epoxyalcohols may function as reactive diluents, since they are colorless, low viscosity liquids. Some examples are: Shell resins 1001 and 1007; Ciba resins 1273 and 1299; and SU-5 and SU-8 from the Celanese Corp.

Preferably, the non-hydroxyl-containing epoxy monomer is 3,4-epoxycyclohexyl-3',4'-epoxy-cyclohexane carboxylate, bis-(3,4-epoxycyclohexyl)adipate, 4-vinylcyclohexene dioxide, limonene dioxide, or dicyclopentadiene dioxide. More preferably, the non-hydroxyl-containing epoxy monomer is 3,4-epoxycyclohexyl-3',4'-epoxycyclohexane carboxylate.

Photosensitizers may be employed in the curing composition to change or broaden the wavelength of sensitivity. By employing such photosensitizers, it is possible to accelerate the polymerization. In addition, such photosensitizers make it possible to use either long wavelength UV or visible light to carry out the photopolymerizations. Among the many types of photosensitizers which may be used are anthracene, phenanthrene, pyrene, perylene, thioxanthone, 2-chlorothioxanthone, 2-isopropylthioxanthone, anthraquinone, camphor-quinone, 1,4-diphenylbutadiyne, acridine orange, acridine red, hematoporphrin, and phosphine R. The choice of the photosensitizer and its concentration will depend on the specific light source and photoinitiators which are used. Typically, the photosensitizer is employed in a concentration ranging from 10–50%, based on the photoinitiator.

In addition to at least one cycloaliphatic epoxyalcohols, at least one non-hydroxyl-containing epoxy monomers and a cationic photoinitiator, a curing composition may include fillers, and viscosity, flow and process control agents.

The polymers and copolymers of the present invention have the structure:

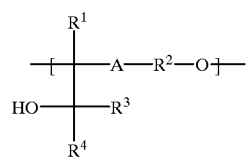

2

The point of attachment to the polymer chain or network of each oxygen atom is a carbon atom derived from an epoxy group; that is, oxygens that are not a part of terminal hydroxy groups are bonded to carbons derived from an epoxy group of another monomer molecule.

The polymers and copolymers produced by the polymerization or copolymerization of cycloaliphatic epoxyalcohols typically have a highly branched structure but are not crosslinked. It is postulated that the polymerization proceeds by rapid epoxide ring-opening by a hydroxy group to generate ether and new secondary hydroxy groups. Chain growth continues by addition to both the epoxy and hydroxy groups of the polymer. These epoxy and hydroxy chain ends can add new monomer units as well as dimers and higher oligomers. It is also expected that some lesser amount of epoxide-epoxide ring-opening occurs simultaneously.

Overall, the number of hydroxy groups typically remains constant during polymerization and the polymer which is produced is highly branched but not crosslinked. As a result of the absence of crosslinking, the polymers and copolymers are generally soluble in polar solvents, such as DMSO.

The curing compositions and polymers of the present invention exhibit good adhesion and may be used in applications such as photocurable optical waveguides, fiber optic coatings and stereolithography (3-D solid imaging).

EXPERIMENTAL

3,4-Epoxycyclohexanemethanol (I)

A stirred solution of 5.00 g (44.58 mmol) of 3-cyclohexene-a-methanol, 556 mL acetone and 1.39 mL of an aqueous phosphate buffer (pH=7.2) were cooled to 0° C. and then 34.25 g (55.72 mmol) of Oxone® (0.4 M solution in water) was added. The phosphate buffer was prepared by dissolving 1.77 g (13.04 mmol) $KH_2PO_4$ and 6.48 g (54.64 mmol) $Na_2HPO_4$ in distilled water and then diluting to give a total volume of 1.5 L. The pH during the reaction was kept at 7.2 by adding 3N NaOH dropwise. After the mixture was allowed to warm to room temperature and stirring was continued for an additional 12. The reaction mixture was transferred to a separatory funnel and extracted several times with methylene chloride. The methylene chloride extracts were combined, dried over anhydrous magnesium sulfate and then filtered. The solvent was removed under reduced pressure leaving 3,4-epoxycyclohexene-1-methanol as a colorless oil.

3-Cyclohexene-1-Methyl Ether

To 150 mL of DMSO placed in a 500 mL round bottom flask equipped with a magnetic stirrer and a reflux condenser were added 16.80 g (0.30 mol) of powdered KOH. After stirring for 1 h, 8.41 g (0.075 mol) of 3-cyclohexene-1-methanol was added followed immediately by 21.29 g (0.15 mol) of methyl iodide. The colorless mixture was stirred at room temperature for 45 min., then washed with water and extracted with methylene chloride. The organic phase was dried over anhydrous magnesium sulfate and then the solvent was removed using a rotary evaporator. The resulting oil was subjected to vacuum distillation. The desired product, 3-cyclohexene-1-methyl ether, b.p. 34–35° C. at 0.5 mm Hg was obtained in 61% yield (5.77 g) as a colorless oil.

3,4-Epoxycyclohexane-1-Methyl ether (IM)

Into a 100 mL three necked round bottom flask equipped with a magnetic stirrer and reflux condenser were placed 4.00 g (31.69 mol) of 3-cyclohexene-1-methyl ether, 15 mL $CHCl_3$, 0.28 g (0.71 mmol) of Aliquot® 336, 18.16 g of 8% aqueous hydrogen peroxide, 0.58 g (1.78 mmol) of sodium tungstate dihydrate and 1.12 g of 40 w/v% of phosphoric acid. The reaction mixture was stirred for 16 h at 65° C. Following this, the aqueous phase was separated and the organic phase was washed several times with water. The organic phase was dried over anhydrous sodium sulfate. After filtration, the solvent was removed under reduced pressure and the resulting oil fractionally distilled under high vacuum. There were obtained 2.75 g (61% theory) of 3,4-epoxycyclohexene-1-methyl ether, having a boiling point of 29° C. at 0.1 mm Hg.

Real-Time Infrared Spectroscopy (RTIR) Method for Determination of Polymerization Rate The kinetics of the UV-induced cationic epoxide ring-opening polymerizations were followed by real-time infrared spectroscopy (RTIR). The MIDAC M-1300 FTIR spectrometer was fitted with a UVEX Model SCU-110 mercury arc lamp in which the light was carried through a flexible optic wand to the sample compartment. The end of the wand was placed at a predetermined distance and directed at an incident angle of 45° onto the sample window. The UV light intensity was measured using a UV Process Supply Inc. Control Cure Radiometer. Evaluation of the received spectra and the calculations of peak integrals or curve fittings were performed using MIDAC GRAMS/386 for Windows Version 3.0 b software. The sample temperature was recorded with the aid of an Omega DP25-TC-AIR optical pyrometer. The detector of the optical pyrometer was placed at distance of 10 cm from the sample.

To make reproducible comparisons between various monomers, all monomers were freshly distilled before use and their purities established by GC. All samples were prepared using the following procedure. A homogeneous solution of a defined concentration of the photoinitiator, IOC-10, and the monomer was prepared. The solution was spread as a thin film of ~25 μm between two layers of 12 μm polypropylene film. To maintain consistent sample thickness, the sample was smoothly coated onto the matte side of the polypropylene film and covered with another identical layer of polypropylene film. The peak to peak distance taken by the interferometer of the FTIR spectrometer was held at a constant value. The sample temperature at the start of the polymerization reaction was also held constant at between 24–26° C. Data was collected at a rate of three complete spectra per second. Unless otherwise noted, all photopolymerizations were conducted at a light intensity of 256 $mJ/cm^2 min$ (4.3 $mW/cm^2$).

The reaction rates were determined from the areas of the infrared absorption band at 1050–1150 $cm^{-1}$. This band is assigned to the linear ether bond formed on ring-opening of the epoxide moiety. The conversions were calculated from the integrations of the peak areas assigned to the epoxide absorption band at wavelengths between 765–930 $cm^{-1}$. Potential interference of a band at 841 $cm^{-1}$ due to one of the absorptions of polypropylene film was eliminated by a curve fitting routine using Gaussian function to separate overlapping peaks. Once the polypropylene peak was separated in the first frame (i.e. spectrum), the peak characteristics were held constant in order to calculate the curve fit in the last frame. Systematic errors using this method of determining the epoxide conversions can be estimated at ±5%. The relative reaction rate for a given monomer can be calculated by using the equation:

$$R_p/[M_o]=([\% \text{ conversion}]_{t2}-[\% \text{ conversion}]_{t1})/(t_2-t_1)$$

In this equation $R_p$ is the rate of polymerization and $[M_o]$ the initial monomer concentration; $t_2$ and $t_1$ are the times between collecting conversion data. A plot of percent conversion, which is related to the peak intensity of the ether formation, versus the irradiation time provides a kinetic curve for the polymerization. The slope of the initial linear portion of the curve corresponds to the factor $R_p/[M_o]$. To insure reproducibility of the data for conversion and reaction rates, all polymerizations were repeated a minimum of three times.

Photoinitiated Cationic Polymerization

Photoinitiated cationic polymerization was conducted using two different techniques. Initially, samples of the monomers I-IV and IM-IVM containing 0.5 mol % IOC-10 photoinitiator were irradiated as thin (25 μm) films on glass substrates using a GE 200 Watt H3T-7 medium pressure mercury arc lamp. Polymerizations under these conditions proceeded very rapidly (1–2 seconds) and definitive distinctions between the different hydroxyl-containing epoxy monomers or the model compounds could not be made.

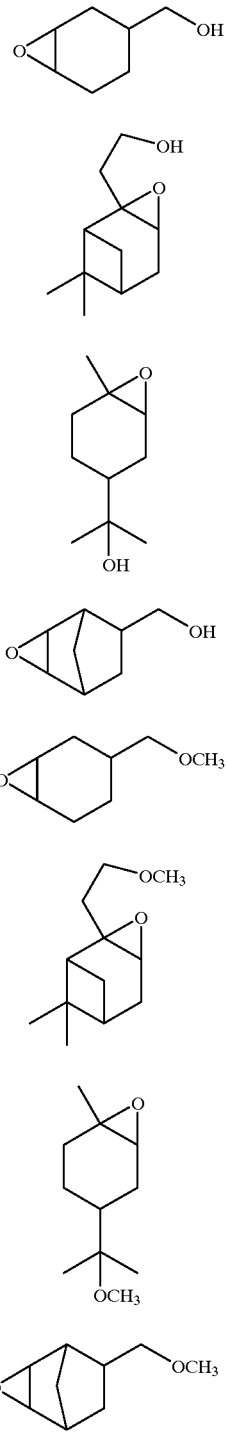

More precise kinetic investigations of the reactivities of the epoxy monomers were carried out using real-time infrared spectroscopy (RTIR). This technique was used because it is a simple, direct method which can be applied to very fast photopolymerizations on a time scale of 1–5 seconds. Moreover, run-time reproducibility in well-controlled experiments can be held to within ±5%. For these studies, a FTIR spectrometer oriented with the IR beam in the vertical direction was employed. Photoinitiated cationic polymerization was carried out by impinging a UV beam onto the sample while simultaneously monitoring the changes in the infrared spectrum as function of time as polymerization takes place.

The samples consisted of a thin film of pure monomers in which the photoinitiator is homogeneously dissolved. A sample film was deposited on a poly propylene carrier film and then immediately covered with another identical carrier film. This minimizes the potential contamination of the monomer by atmospheric water and other adventitious impurities during the polymerization. The "sandwich" was mounted in a standard 5 cm×5 cm slide holder and then placed in the sample compartment of the spectrometer. To maintain consistent conditions, continual UV irradiation at an intensity of 256 mJ/cm$^2$ min (4.3 mW/cm$^2$) was carried out during the entire time of polymerization. In separate experiments, the effects of light intensity and photoinitiator concentration were investigated for selected monomers.

Figure 1:
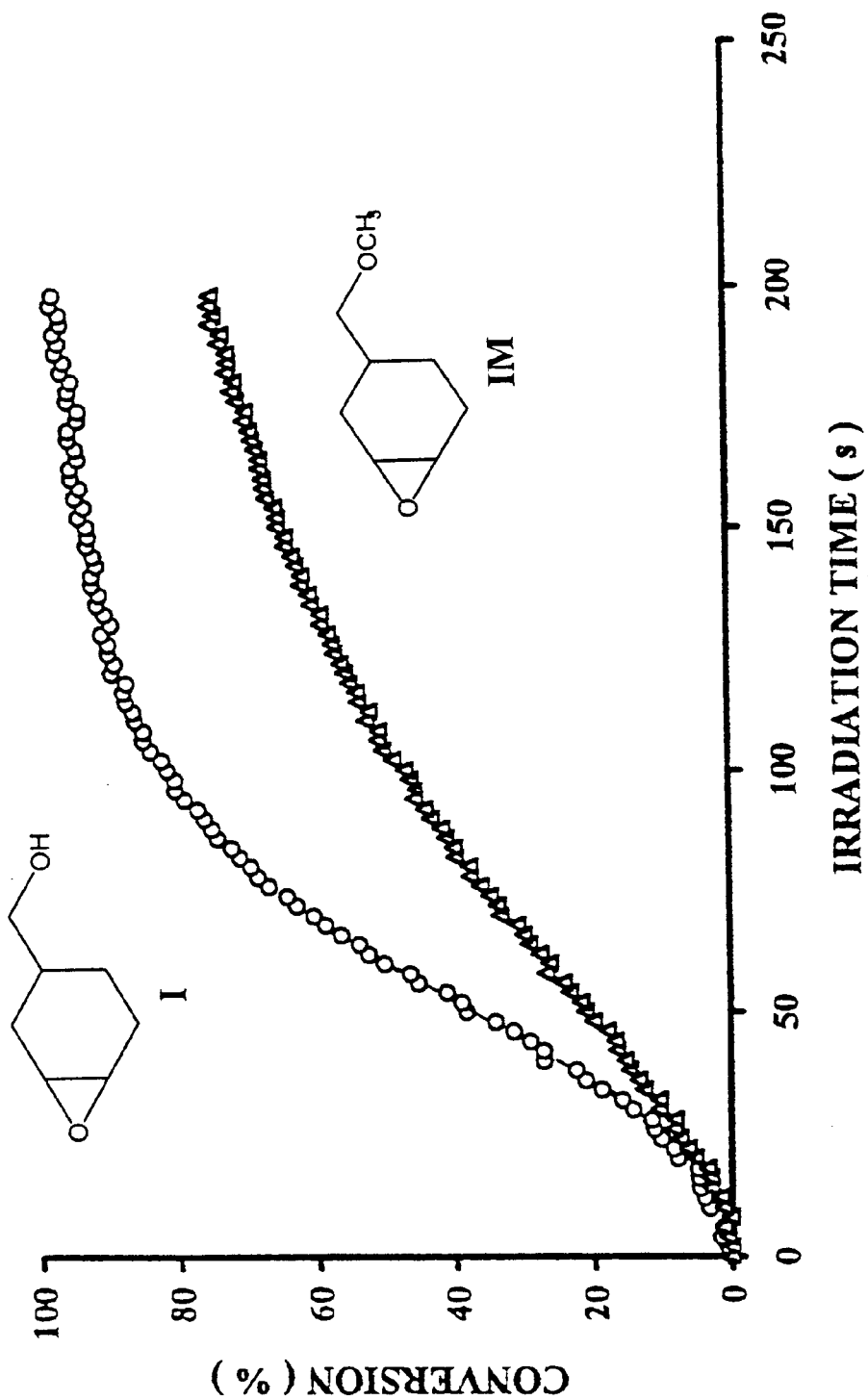
FIG. 1 is a graph of % conversion as a function of irradiation time showing a comparison of the cationic photopolymerization of a curing composition containing the cycloaliphatic epoxyalcohol 3,4-epoxycyclohexanol I and 0.5% IOC10 (4-decyloxyphenyl phenyliodonium hexafluoroantimonate) as photoinitiator with one containing the corresponding methyl ether, IM and the same initiator.

In FIGS. 1–4 are shown the RTIR curves for each of the monomers directly compared with its methyl ether model compound. In every case, the rate of polymerization of the monomer was substantially greater than the model compound which is indicative of the effect of the hydroxyl group in these compounds. The results are even more impressive when one considers the very low level of the light intensity used in these studies. The rate of polymerization of I in FIG. 1 is considerably higher than that of the methyl ether, IM. In FIG. 2, nopol epoxide II and its methyl ether IIM display even greater reactivity which may be due to the increase in ring strain in this tricyclic monomer and to the proximity of the hydroxyl group to the epoxide functional group. In FIG. 3 are compared the cationic photopolymerizations of epoxidized α-terpineol III and its corresponding methyl ether, IIIM. The enormous contrast in the difference in the rates of the two epoxy monomers can be readily seen in this latter figure. Lastly, comparison between the RTIR curves for epoxidized norbornene IV and its methyl ether IVM in FIG. 4 shows a similar dramatic increase in the polymerization rate for the monomer.

The cycloaliphatic epoxyalcohol monomers of the present invention accelerate the polymerization of other types of epoxide-containing monomers. FIG. 5 shows the polymerization of the commercially available biscycloaliphatic monomer, 3,4-epoxycyclohexylmethyl-3',4'-epoxycyclohexanecarboxylate (ERL) carried out in the presence of a molar equivalent of IV and 0.5 mol % of IOC10 as the photoinitiator. In the same figure is shown the kinetic curve for the photopolymerization of ERL carried out under identical conditions. There is a striking acceleration of the polymerization in the presence of ERL in the presence of IV, on the order of a 100% increase in the rate of polymerization.

What is claimed is:
1. A photopolymerizible composition comprising:
   (a) a cationic photoinitiator; and
   (b) at least one cycloaliphatic epoxyalcohol monomer chosen from:

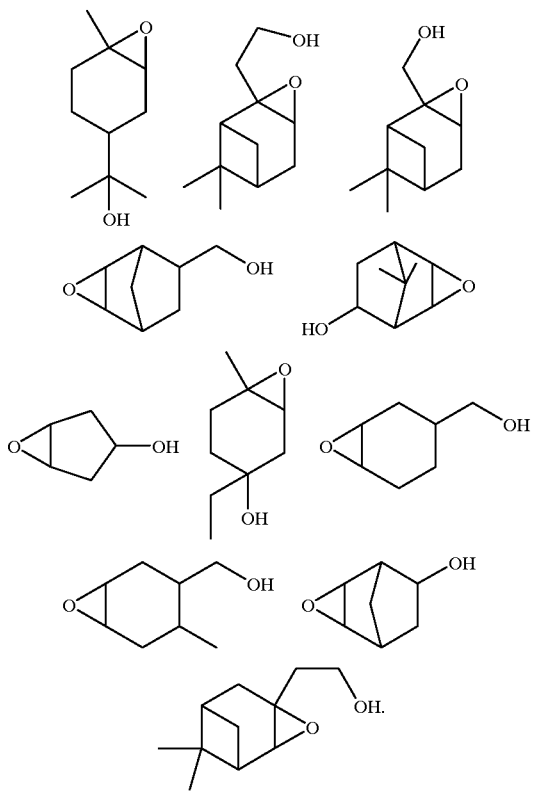

2. The composition of claim 1, wherein said cycloaliphatic epoxyalcohol monomer is chosen from:

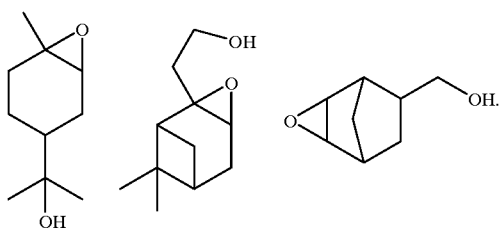

3. The composition of claim 1, wherein said cationic photoinitiator is chosen from triarylsulfonium salts and diaryliodonium salts.

4. The composition of claim 1, further comprising at least one non-hydroxyl-containing epoxy monomer chosen from the group consisting of: 3,4-epoxycyclohexyl-3',4'-epoxycyclohexane carboxylate, bis-(3,4-epoxycyclohexyl) adipate, 4-vinylcyclohexene dioxide, limonene dioxide, dicyclopentadiene dioxide, 1,2-epoxytetradecane, 1,2-epoxydecane, 1,2-epoxydodecane, bisphenol-A diglycidyl ether, bisphenol-F diglycidyl ether, 1,4-butanediol diglycidyl ether, diglycidyl ethers of tetrabromo-bisphenol-A, epoxy cresol novolacs, epoxy phenol novolacs, epoxidized soybean oil, epoxidized linseed oil and diglycidyl phthalate.

5. The composition of claim 4, wherein said non-hydroxyl-containing epoxy monomer is chosen from the group consisting of: 3,4-epoxycyclohexyl-3',4'-epoxycyclohexane carboxylate, bis-(3,4-epoxycyclohexyl) adipate, 4-vinylcyclohexene dioxide, limonene dioxide, and dicyclopentadiene dioxide.

6. The composition of claim 4, wherein said non-hydroxyl-containing epoxy monomer is 3,4-epoxycyclohexyl-3',4'-epoxycyclohexane carboxylate.

7. A method of accelerating the cure rate of an epoxy curing composition comprising:
(a) combining to form an epoxy curing composition:
(1) an amount of at least one cycloaliphatic epoxyalcohol monomer sufficient to cause at least 50% increase in cure speed of said epoxy curing composition, said cycloaliphatic epoxyalcohol monomer being chosen from:

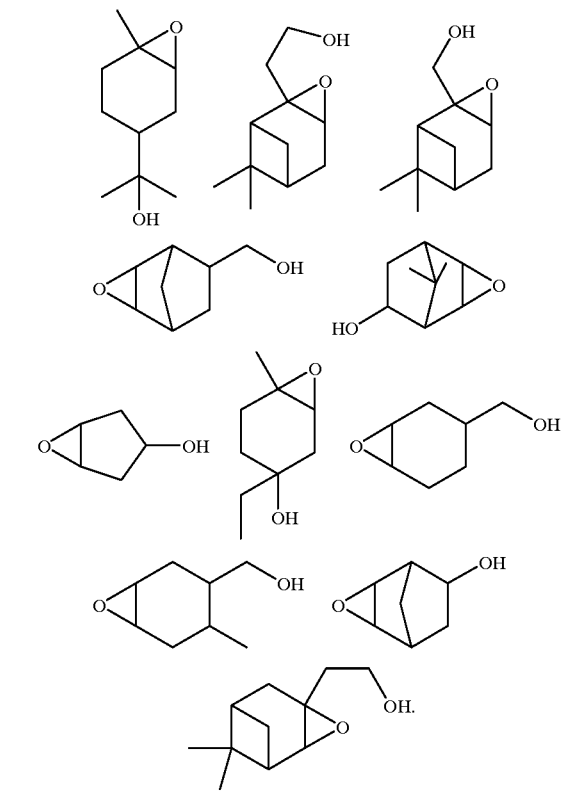

(2) at least one non-hydroxyl-containing epoxy monomer chosen from the group consisting of:
3,4-epoxycyclohexyl-3',4'-epoxycyclohexane carboxylate, bis-(3,4-epoxycyclohexyl)adipate, 4-vinylcyclohexene dioxide, limonene dioxide, dicyclopentadiene dioxide, 1,2-epoxytetradecane, 1,2-epoxydecane, 1,2-epoxydodecane, bisphenol-A diglycidyl ether, bisphenol-F diglycidyl ether, 1,4-butanediol diglycidyl ether, diglycidyl ethers of tetrabromo-bisphenol-A, epoxy cresol novolacs, epoxy phenol novolacs, epoxidized soybean oil, epoxidized linseed oil and diglycidyl phthalate; and
(3) a cationic photoinitiator; and
(b) exposing said epoxy curing composition to a source of radiation.

8. The method of claim 7, wherein said cycloaliphatic epoxyalcohol monomer is chosen from:

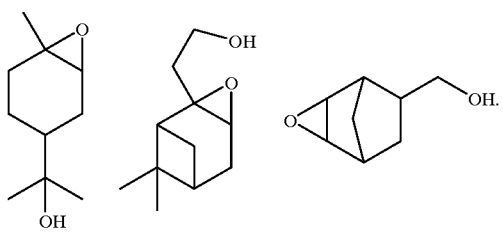

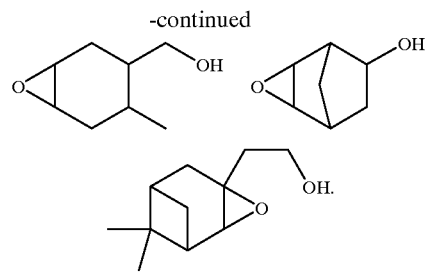

9. The method of claim 7, wherein said non-hydroxyl-containing epoxy monomer is chosen from the group consisting of: 3,4-epoxycyclohexyl-3',4'-epoxycyclohexane carboxylate, bis-(3,4-epoxycyclohexyl)adipate, 4-vinylcyclohexene dioxide, limonene dioxide, and dicyclopentadiene dioxide.

10. The method of claim 7, wherein said non-hydroxyl-containing epoxy monomer is 3,4-epoxycyclohexyl-3',4'-epoxycyclohexane carboxylate.

11. The method of claim 7, wherein said cationic photoinitiator is chosen from triarylsulfonium salts and diaryliodonium salts.

12. A polymer comprising repeating units derived from at least one cycloaliphatic epoxyalcohol monomer chosen from:

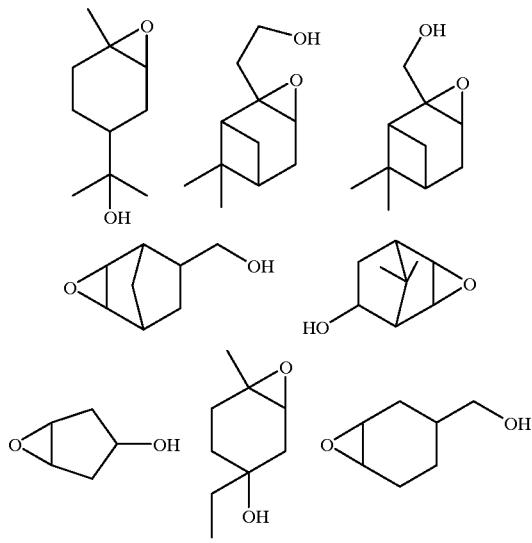

13. The polymer of claim 12, wherein said repeating units are derived from at least one cycloaliphatic epoxyalcohol monomer chosen from:

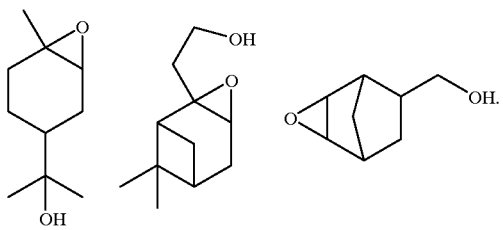

14. The polymer of claim 12, further comprising repeating units derived from at least one non-hydroxyl-containing epoxy monomer chosen from the group consisting of: 3,4-epoxycyclohexyl-3',4'-epoxycyclohexane carboxylate, bis-(3,4-epoxycyclohexyl)adipate, 4-vinylcyclohexene dioxide, limonene dioxide, dicyclopentadiene dioxide, 1,2-epoxytetradecane, 1,2-epoxydecane, 1,2-epoxydodecane, bisphenol-A diglycidyl ether, bisphenol-F diglycidyl ether, 1,4-butanediol diglycidyl ether, diglycidyl ethers of tetrabromo-bisphenol-A, epoxy cresol novolacs, epoxy phenol novolacs, epoxidized soybean oil, epoxidized linseed oil and diglycidyl phthalate.

15. The polymer of claim 14, wherein said non-hydroxyl-containing epoxy monomer is chosen from the group consisting of: 3,4-epoxycyclohexyl-3',4'-epoxycyclohexane carboxylate, bis-(3,4-epoxycyclohexyl)adipate, 4-vinylcyclohexene dioxide, limonene dioxide, and dicyclopentadiene dioxide.

16. The polymer of claim 14, wherein said non-hydroxyl-containing epoxy monomer is 3,4-epoxycyclohexyl-3',4'-epoxycyclohexane carboxylate.

* * * * *